United States Patent [19]

Amundsen et al.

[11] 4,379,810

[45] Apr. 12, 1983

[54] WATER SOLUBLE PENTACHLOROPHENOL AND TETRACHLOROPHENOL WOOD TREATING SYSTEMS CONTAINING FATTY ACID AMINE OXIDES

[75] Inventors: Joseph Amundsen, Federal Way; Robert J. Goodwin, Puyallup; William H. Wetzel, Federal Way, all of Wash.

[73] Assignee: Reichhold Chemicals, Incorporated, White Plains, N.Y.

[21] Appl. No.: 409,151

[22] Filed: Aug. 18, 1982

Related U.S. Application Data

[60] Division of Ser. No. 297,162, Aug. 28, 1981, Pat. No. 4,357,163, which is a continuation-in-part of Ser. No. 176,795, Aug. 11, 1980, Pat. No. 4,288,249, which is a continuation of Ser. No. 14,955, Feb. 26, 1979, abandoned, which is a continuation of Ser. No. 875,035, Dec. 2, 1977, abandoned.

[51] Int. Cl.$^{3}$ .......................... B05D 1/18; B27K 3/00; C09D 5/16

[52] U.S. Cl. .................................... 428/541; 428/907; 106/18.35; 427/440

[58] Field of Search ................. 428/541, 907; 427/440

[56] References Cited

U.S. PATENT DOCUMENTS

| | | | |
|---|---|---|---|
| 1,919,298 | 7/1933 | Lehman et al. | 424/325 |
| 2,322,633 | 6/1943 | Hitchens | 167/38.7 |
| 2,908,607 | 10/1959 | Hager | 167/38.7 |
| 3,281,318 | 10/1966 | Stutz | 167/38.7 |
| 3,877,979 | 4/1975 | Clark | 428/907 X |
| 3,993,752 | 11/1976 | Stutz | 424/129 |
| 4,234,665 | 11/1980 | Johnston | 428/907 X |
| 4,296,152 | 10/1981 | Kirchner | 428/907 X |

*Primary Examiner*—P. Ives

[57] ABSTRACT

This invention relates to new and improved chlorinated phenol water soluble wood treating compositions and methods for preservation of wood or products made from wood. In the general practice of this invention, wooden objects are treated with water soluble wood treating and preserving solutions consisting of blends of from 0.1% to about 50% by weight of a chlorophenol selected from a group consisting of pentachlorophenol and tetrachlorophenol and mixtures thereof, from about 1% to about 97% by weight aliphatic alcohols having from 1 to 6 carbon atoms and mixtures thereof, from about 0.2% to about 35% of a fatty acid amine oxide or a mixture of fatty acid amine oxides and other amines, and from about 1% to about 97% by weight water. In addition, these wood treating formulations may contain up to 10% by weight of added ingredients selected from the group of tetrasodium pyrophosphate, copper salts, sodium chromates, sodium gluconate, sodium citrate, sodium N-dihydroxyethylglycinate and/or up to 20% by weight ammonium or sodium lignin sulfonate.

In practice of this invention, these compositions are incorporated into treating systems that adequately penetrate wood and deposit essentially non-leachable chlorophenols in the wooden objects.

16 Claims, No Drawings

WATER SOLUBLE PENTACHLOROPHENOL AND TETRACHLOROPHENOL WOOD TREATING SYSTEMS CONTAINING FATTY ACID AMINE OXIDES

BACKGROUND OF THE INVENTION

This is a division of application Ser. No. 297,162 filed Aug. 28, 1981, now U.S. Pat. No. 4,357,163, which in turn was a continuation-in-part of our copending application for Letters Patent Ser. No. 176,795 filed Aug. 11, 1980 now U.S. Pat. No. 4,288,249; which is a continuation of Ser. No. 014,955 filed Feb. 26, 1979; which is a continuation of Ser. No. 875,035 filed Dec. 2, 1977, both now abandoned.

Wood has been used for many years as an important building and construction material and its importance as such is increasing for a number of reasons. Typical uses include general construction, residential housing, utility poles, cross arms, fence posts, railroad ties and pilings. Although wood is a renewable natural resource, it must be protected from attack by insects and fungus and marine organisms for many of these applications. Left unprotected or unpreserved such as by chemical treatment, wood will decay and deteriorate anywhere from within a few months to a few years, depending upon climate and soil conditions. Wood objects such as utility poles and timbers deteriorate rapidly below the ground and at ground level and would require frequent replacement if not properly and adequately preserved with a material which is both effective against attacking organisms and long lasting.

Through the years, a number of different materials have been used for preservation. Among these are included creosote, heavy metal salts, heavy oils and tars, pitch and various organic materials including chlorinated phenols, especially pentachlorophenol (PCP). Each of these materials has its advantages and disadvantages. Creosote, as well as other heavy oils and tars and pitch treatments, may have a strong odor and leave the surface greasy and oily to the touch.

Chlorinated phenols have found wide use because of their effectiveness, relative ease of application and durability. Because of its particularly good fungicidal and insecticidal properties, pentachlorophenol is widely used as a commercial wood preservative. It is normally dissolved in hydrocarbon solvents such as medium aromatic oils, volatile petroleum solvents (propane), light solvents (mineral spirits), or in a chlorinated hydrocarbon solvent-inhibited grade of methylene chloride. Cosolvents are added in many instances to achieve proper solubility of pentachlorophenol in the solutions. Because energy conservation is becoming increasingly important, many of the traditional treating solvents are more valuable as feed stocks for other chemical products. Therefore, a low energy based solvent such as water has been sought as a replacement for these hydrocarbon solvents. The difficulty has been that pentachlorophenol in a simple admixture with water has little or no solubility. Prior art shows that pentachlorophenol can be reacted with sodium hydroxide in water to form the water soluble sodium pentachlorophenate. To date this is the only aqueous soluble form of pentachlorophenol that has been commonly used in the wood treating industry. However, sodium pentachlorophenate treating solution has a severe disadvantage in its excess leachability during field use and some lack in penetrating ability. In the practice of our invention, new water soluble pentachlorophenol, treating solutions are disclosed which overcome these problems even when using sodium pentachlorophenate.

The closest art known to the applicants is contained in the following U.S. Pat. Nos. 1,919,298; 2,322,633, 2,908,607; 3,281,318; and 3,993,752.

DETAILED DESCRIPTION OF THE INVENTION

In accordance with this invention, novel pentachlorophenol-aliphatic alcohol—fatty acid amine oxide systems or tetrachlorophenol-aliphatic alcohol—fatty acid amine oxide systems are disclosed that are compatible with water and are soluble therein. These systems may contain ammonia and/or sodium hydroxide. Aliphatic alcohols, such as those containing one to six carbon atoms and particularly the butyl alcohols, are essential ingredients in solubilizing pentachlorophenol in water even though the butyl alcohols are sparingly water soluble themselves. The fatty acid amine oxides in the systems are also essential in providing stability and effective penetration of the systems into the wood fibers being treated. Upon contact and penetration into cellulosic materials and during the drying process, the perservative in the wood becomes fixed and essentially non-leachable. It has also been found that when soluble metal salts such as copper sulfate, copper acetate or copper carbonate and chromium salts are included in these treating systems, additional fixation and preservative properties are obtained. In addition, we have found that additives such as tetrasodium pyrophosphate, sodium gluconate, sodium citrate, sodium N-dihydroxyethylglycinate and a lignin sulfonate such as ammonium or sodium lignin sulfonate provide increased effectiveness. In the various formulations, water in widely varying percentages is used as the main solvent to form the treating solution.

The pentachlorophenol employed in the present compositions may be present in pure form or as a technical mixture. Pentachlorophenol meeting the requirements of Federal Specification TT-W-570 and American Wood Preservers Association P8-74 is especially suitable. These specifications require that pentachlorophenol contain not less than 95% of chlorinated phenols. It shall contain not more than 1% of matter insoluble in N/1 aqueous sodium hydroxide solution, and it shall have a freezing point of not less than 174° C.

Other chlorinated phenols such as tetrachlorophenol or mixtures of tetra and pentachlorophenol may also be used in place of the pentachlorophenol as well as the sodium salts of these chlorinated phenols.

Several things must be considered when attempting to prepare water soluble pentachlorophenol treating solutions. Acceptable aqueous pentachlorophenol treating solutions must be capable of penetrating deep into the wood and becoming deposited therein in an essentially non-leachable form. Previous attempts to prepare water soluble pentachlorophenol treating solutions could not achieve satisfactory results in either of these two requirements.

Therefore, it was unexpected that water soluble pentachlorophenol treating solutions could be obtained which, in fact, do penetrate deeply into wood and deposit the pentachlorophenol in an essentially non-leachable form in the practice of our invention. These solutions generally comprise pentachlorophenol, an alcohol, a fatty acid amine oxide, ammonia or sodium hydroxide and water as the main solvent. When wood is pressure treated with such a solution and dried, the pentachlorophenol or tetrachlorophenol becomes fixed into the wood.

The unexpected discovery of the effectiveness of aliphatic alcohols, especially the butyl alcohols, when used in conjunction with fatty acid amine oxides in promoting the solubility of pentachlorophenol into aqueous systems is unique in consideration of the fact that pentachlorophenol itself is very insoluble in water and that n-butyl alcohols are only soluble in water at room temperature to the extent of 9 parts alcohol to 100 parts water.

It was further discovered that the aliphatic alcohol-pentachlorophenol—fatty acid amine oxide water soluble systems could be enhanced by pH control by ammonia hydroxide or other lower amines and by additions of further such additives.

Mixtures of various alcohols can be used successfully in the formulations of our invention as well as the specific alcohols alone. Among the alcohols used alone or in combination are those having from one to six carbon atoms including methyl alcohol, ethyl alcohol, n-butyl alcohol, isopropyl alcohol, n-propanol, allyl alcohol, secondary butyl alcohol, isobutyl alcohol, tertiary butyl alcohol, and diacetone alcohol. From about 1% to about 97% of the alcohols may be used.

An improved wood treating solution that has a high degree of penetration into the wood fibers as well as reduced time necessary for wood treating has been formed by the inclusion of a fatty acid amine oxide or oxides. In addition, the employment of the fatty acid amine oxides greatly increases the stability of the wood treating and preserving solution, not only during the treating process under increased temperature and pressure but also when the treating solution is recycled back into the storage and mixing tanks between treating charges. An additional advantage in employing the fatty acid amine oxides is that it is easier to reconstitute the recycled solution after it has been used during the wood treating and preserving operation thus making it more economical in recovering the spent solution and to bring it back to its proper quality and effectiveness.

It has also been found that the finished treated wood product exhibited improved qualities over other products treated by known wood treating and preserving solutions in that the treated wood was devoid of disagreeable odor, exhibited no greasy feel, and was substantially free of bleeding of treating solution from the impregnated wood fibers after drying. It will be appreciated that in the practice of this invention, the non-leachable chlorophenols are deposited in the wooden object.

Exemplary of the fatty acid amine oxides having from about 10 to about 32 carbon atoms are the aliphatic amines such as dimethylcocoamine oxide that contains usually from about 12 to about 20 carbon atoms. Also the oxides of tallowamine, stearyl amine, the dimethylamine, and the like may be used. Typical of these amine oxides are the Aromax ® amine oxides produced by the Armak Company and includes amines having the general chemical structure

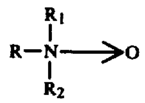

where R is an aliphatic radical containing 12 to 20 carbon atoms and $R_1$ and $R_2$ are each aliphatic radicals containing one to two carbon atoms or hydroxy substituted aliphatic radicals containing one to two carbon atoms or mixtures of said amine oxides or hydroxy substituted amine oxides. The preferred amine oxides of this invention are bis (2-hydroxyethyl) cocoamine oxide, bis (2-hydroxyethyl) tallowamine oxide, bis (2-hydroxyethyl) stearylamine oxide, bishydroxyethyldecyloxypropylamine oxide, bishydroxyethyltridecyloxypropylamine oxide, dimethylcocoamine oxide, dimethyl-hydrogenated tallowamine oxide, dimethylhexadecylamine oxide, and mixtures thereof.

Fatty acid amine oxides also may be used that are produced by the Sherex Chemcial Company having the general chemical structure

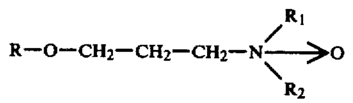

where R is an aliphatic radical containing 9 to 15 carbon atoms and $R_1$ and $R_2$ are two hydroxyethyl and/or two hydroxypropyl radicals.

Other fatty acid amine oxides that may be used are "MAZOX" series by Mazer Chemicals, Inc., the "NINOX" series by Stepan Chemical Co., the "SCHERCAMOX" series by Sher Chemicals, Inc., the AO series by the Tomah Chemical Co., and include lauryl dimethylamine oxide, myristyl dimethylamine oxide, myristyl/cetyl dimethylamine oxide, cetyl dimenthylamine oxide, stearyl dimethylamine oxide, cocoamido propyl dimethylamine oxide.

In forming the wood treating and preserving solution it has been found that from about 0.2% to about 35% by weight of the fatty acid amine oxide produces a solution that exhibits a high degree of penetration as well as depositing an essentially non-leachable chlorophenol within the wood fibers.

It has also been found that the inclusion of up to about 0.5% of a chelating agent such as ethylenediaminetetraacetic acid (EDTA) or the sodium salts thereof helps to stabilize the wood treating and preserving solution and ties up metalic radicals in the solution preventing discoloration of the finished treated wood product. Any suitable chelating agent that is compatible with the system, such as the ethylenediaminetetraacetic acid (EDTA) or the sodium salts thereof or the like, may be used.

Copper salts which may be used include copper sulfate, copper carbonate, copper hydroxide, copper oxide, copper acetate and copper chloride.

In the practice of our invention, wooden objects are treated with compositions comprising principally blends from about 0.1% to about 50.0% by weight of pentachlorophenol or tetrachlorophenol, the sodium salts thereof, or mixtures thereof and from about 1% to about 97% aliphatic alcohol, i.e., alcohol having from 1 to 6 carbon atoms, particularly n-butyl alcohol, and from about 0.2% to about 35% ammonium hydroxide or amines, and from about 0.2% to about 35% of a fatty acid amine oxide and from 1% to about 97% water.

In addition, these wood treating formulations may include varying amounts of tetrasodium pyrophosphate (0–10% by weight), copper salts (0–10% by weight), sodium citrate (0–10% by weight), sodium N-dihydroxyethylglycinate (0–10% by weight), and a lignin sulfonate such as ammonium or sodium lignin sulfonate (0–20% by weight) as added ingredients.

As stated previously, extreme leachability problems have always been encountered when using water solutions of sodium salts of chlorinated phenols as wood preservatives. By practice of our invention it is now possible to even prepare water-borne solutions of sodium pentachlorophenate and tetrachlorophenate which may be deposited in wood in essentially a non-leachable form.

Either pentachlorophenol or tetrachlorophenol or mixtures thereof may be used in these particular formulations and formed into the sodium salt prior to use by reacting with sodium hydroxide or previously prepared commercially available sodium pentachlorophenate or tetrachlorophenate may be used.

Pentachlorophenol or tetrachlorophenol are used as the starting material they can be used as such or mixed with sodium hydroxide and water. Then the treating solution is prepared from additions of alcohol, amine(s), and water. In this manner, a treating solution is prepared which, when used to treat the wooden objects of this invention, deposits the waterborne penta or tetrachlorophenol in the wood in an essentially non-leachable form. Any of the amine, ammonia or lignin sulfonates previously described may be used. It has been found that solutions may be prepared using from about 0.1% to about 50% by weight pentachlorophenol or tetrachlorophenol, from about 0.02% to about 20% by weight sodium hydroxide (when additionally used), from about 0.2% to about 35% by weight amine oxide, from about 0.25% to about 20% by weight lignin sulfonate and from about 0.1% to about 10% by weight copper sulfate. Water may be used from 1% to about 97% by weight.

Various formulations of this invention were prepared and tested as to their effectiveness for wood penetration and wood fixation properties. This involved wood treatment, leaching tests and analysis. The leaching tests and analysis generally conform to American Wood Preservers Association specifications M11-66 Method to Determine Leachability of Wood Preservatives and A5-76 Determination of Chloride for Calculating Pentachlorophenol in Solution or Wood.

The experimental details of leaching tests may be described as follows:

Four comparable ¾"×¾"×¾" Douglas fir or Southern pine sapwood blocks treated with like solution retentions were split in two groups. The blocks in Group 1 were directly assayed for pentachlorophenol while the Group 2 blocks were leached and then assayed for pentachlorophenol. The blocks were weighted before and after treatment to determine retentions. Retention of control and leached blocks was considered and corrections made where necessary. The percent pentachlorophenol retained in the leached blocks was reported in the examples by use of the following equation:

$$\frac{\text{Leached blocks average } PCP \text{ assay}}{\text{Unleached blocks average } PCP \text{ assay}} \times 100 =$$

-continued

Percent preservative retention in leached blocks

The retained leaching water was also analyzed for preservative content. The treating equipment used for the most part (small scale) was that described in the American Wood Preservers Association specification M11-66; however, in some examples a commercial treating plant operation was used.

Although the examples here contain mostly 1 to 2% pentachlorophenol, they can be readily formulated to contain from 1% to 50% pentachlorophenol. The 1% to 2% formulas are used because they more closely conform to the amount generally used in commercially treated wood to meet present military and American Wood Preservers Association assay retention specifications.

These examples, in general, illustrate the facets and details of this invention, but are not to be construed as limiting the scope to the same.

EXAMPLE #1

To formulate a concentrate of tetrachlorophenol (TCP):

Formula:

40 lb. TCP 50 lb. butyl alcohol 10 lb. dimethylcocoamine oxide*

*Armox DMMC-W.

The TCP was added with stirring to a mixture of butyl alcohol until the TCP was completely dissolved and then the cocoamine oxide was slowly added.

EXAMPLE #2

To formulate a treating solution from the concentrate of Example #1:

Formula:

1026 lb. water 120 lb. $NH_4OH$ (28%)

9 lb. copper sulfate 45 lb. of concentrate from Example #1

The ingredients of Examples 1 and 2 can be mixed in any order, but it is convenient to first dissolve the TCP in the alcohol and then include the fatty acid amine oxide.

The above treating solution was used to impregnate dimensioned lumber and it was found that a high degree of depth penetration with high retention of the tetrachlorophenol was realized.

EXAMPLE #3

To formulate a concentrate of pentachlorophenol (PCP):

Formula:

42 lb. PCP 32 lb. methyl alcohol 15 lb. 2-hydroxyethyl cocoamine oxide*

6 lb. diacetone alcohol

*Armox C/12W Fatty acid amine oxide of Armak Company.

EXAMPLE #4

To formulate a treating solution from the concentrate of Example 190 3:

Formula:

94.9 lb. water 1.5 lb. $NH_4OH$ (as $NH_4$)

3.6 lb. concentrate from Example #3.

The above treating solution containing the penta concentrate of Example 3 was used to impregnate wooden poles and after testing it was found that the poles exhibited a high degree of depth penetration and excellent retention of the pentachlorophenol that had penetrated the poles.

EXAMPLE #5

Using the treating solution formulated in Example #4, seven charges were made and wood products were treated. The treating solution was 1.5% pentachlorophenol solution. A first mix was made totaling approximately 26,400 gallons of 1.5% pentachlorophenol solution. Water was introduced to the storage tanks and then ammonia was added to 1.5%. This solution was pumped into the retort which is used for pressure treating wood and heated to 140° F. After heating, it was reintroduced to the storage tank and circulated during the addition of the aqued which is 50% ammonium hydroxide (28% $NH_4$) and 50% EDTA. Penta concentrate was then added at 30 psig. pressure. This solution was analyzed and found to contain 1.53% penta by weight. Charge #1 was then treated and contained 733 cubic feet of nominal 4"×4"×8' dry incised Hem-Fir. An initial vacuum of approximately 26 inches of mercury for ½ hour was applied before the introduction of the preservative solution to the retort. A similar full cell process was used for all subsequent charges varying only in maximum temperature and pressure and time at pressure. The solution temperature during treatment was 120° F., and the pressure period lasted one hour with the maximum pressure at 20 psig. followed by a 15-minute vacuum. Approximately 25 lb. of solution per cubic foot was pressed into the wood. The analysis on cores from twenty pieces of wood showed a 0.48 lb. per cubic foot of pentachlorophenol retention in the 0 to 0.6" zone. The analysis run in increments of 0.2" to a depth of 0.6" was as follows:

| Zone* | Pounds of Penta per Cubic Foot of Wood | |
|---|---|---|
| 0.0-0.2" | 0.78# | Average 0.57# |
| 0.2"-0.4" | 0.51# | |
| 0.4"-0.6" | 0.41# | |

*Inches of depth of penetration towards core of wooden object.

After the treatment the wood surfaces were clean and dry, and the color of the treated wood was a light brown similar in appearance to newly cut Western Red Cedar heartwood.

Charge #2 contained 737 cubic feet of nominal 2"×6"×14' long unincised inland Hemlock from Idaho. This material is considered difficult to treat. It cannot be satisfactorily impregnated with copper chrome arsenic. Approximately 23 lb. of solution per cubic foot was pressed into this material at 120° F. and 135 psig. for 8 hours. The solution exhibited the ability to easily penetrate this wood. Analysis of the cores taken from twenty pieces of wood showed 0.375# of pentachlorophenol per cubic foot retention in the 0.0-0.6" zone. This retention could be increased readily by increasing the solution strength or by increasing the pressing time. This again was a successful treatment with wood surfaces having a light brown color and being clean and dry.

Charge #3 contained 466 cubic feet of 4.5" diameter, 8' long, air seasoned, unincised Lodgepole Pine round stock. A 4 hour pressure period with a maximum temperature of 120° F. and pressure of 130 psig. was used. Analysis of the cores taken from twenty posts showed 0.49# of penta per cubic foot retention in the 0.0-1.0" zone. The results on this charge were excellent with full sapwood treatment and clean, dry, light brown wood surfaces.

Charge #4 contained green and dry Douglas Fir, dry Lodgepole Pine, Ponderosa Pine, Cedar and Cedar shakes, Hem-Fir channel siding and lumber, and Ponderosa Pine posts. After 4 hours press time, 18 pounds of solution was retained per cubic foot of wood. Retention of pentachlorophenol per cubic foot of material as analyzed ranged between 0.3# and 0.9# in the 0.0 to 0.6" zone. Two examples are Lodgepole Pine lumber at 0.43# and Ponderosa Pine at 0.49# of pentachlorophenol per cubic foot.

A second mix of 2000# of pentachlorophenol concentrate contained an average of 7% additional amine material. Also included was 126# of aqued. The addition of the concentrate, after adding the aqued, increased the solution strength of approximately 18,000 gallons of 1.53% solution to 1.93%. Enough ammonia was added to increase its content from 1.5 to 2.0%.

Charge #5 was composed of 888 cubic feet of class 5, 40' long Douglas Fir poles which were air seasoned and incised. This charge after 13 hours subjected to pressure of 130 psig. and a maximum temperature of 130° F. was completed. Approximately 12# of solution per cubic foot was pressed into the poles. The appearance of the treated poles was excellent—light brown with clean, dry surfaces. Analysis of samples from poles showed full sapwood penetration of preservative.

Charge #6 was 1006 cubic feet of Douglas Fir and Hemlock Poles having a wide range in moisture content. Most of the poles were unincised class 3, 40' long Douglas Fir. This charge was steam conditioned at 240° F. for 3 hours before applying an initial 2 hour vacuum. The amount of solution pressed into the wood was 17½ pounds per cubic foot after 18 hours of pressure at 135 psig. and a maximum temperature of 140° F.

Charge #7 was second growth Western Red Cedar poles. An initial vacuum of ½ hour was used and then a maximum pressure of 70 psig. applied for 11½ hours. The penetration of the preservative solution was excellent with 17½ pounds of solution per cubic foot of material. The appearance was excellent with clean dry wood surfaces.

In all the tests run on the seven charges, samples of treating solution were taken from the storage tank which was also the working tank, and the solution condition remained good. Analysis of the treating solution before and after treatments showed that the strength remained constant.

What is claimed is:

1. A treated and preserved wooden object having a deposit within the wood fibers of an essentially nonleachable chlorophenol formed therein by I. forming a wood treating and preserving solution by blending (A) from about 0.1% to about 50% by weight of a chlorophenol selected from a group consisting of pentachlorophenol and tetrachlorophenol and mixtures thereof, (B) from about 1% to about 97% by weight of an aliphatic alcohol having from one to six carbon atoms and mixtures thereof, (C) from about 0.2% to about 35% by weight of a fatty acid amine oxide having from about 10 to about 32 carbon atoms, (D) from about 1% to about 97% by weight water, and (E) from about 0.2% to about 35% by weight of an amine selected from the group consisting of ammonium hydroxide, triethylamine, trimethylamine, methyl amine and methyldiethanol amine and mixtures thereof;

II. impregnating under heat and pressure the wooden object;

III. separating said wooden object from said solution; and

IV. drying said treated wooden object.

2. The treated and preserved wooden object according to claim 1 wherein (C), said fatty acid amine oxide, is an amine oxide having the following formulation:

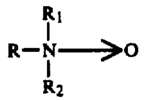

wherein R is a hydrocarbon radical of from about 10 to about 32 carbon atoms and $R_1$ and $R_2$ are each aliphatic radicals of from one to two carbon atoms or hydroxy substituted aliphatic radicals of from one to two carbon atoms, and mixtures thereof.

3. The treated and preserved wooden object according to claim 1 wherein the aliphatic alcohol of (B) is selected from the group consisting of methyl alcohol, ethyl alcohol, n-butyl alcohol, isopropyl alcohol, n-propyl alcohol, allyl alcohol, secondary butyl alcohol, isobutyl alcohol, tertiary butyl alcohol, and diacetone alcohol, and mixtures thereof.

4. The treated and preserved wooden object according to claim 2 wherein the amine oxide of (C) is selected from the group consisting of bis (2-hydroxyethyl) cocoamine oxide, bis (2-hydroxyehtyl) tallowamine oxide, bis (2-hydroxyethyl) stearylamine oxide, dimethylcocoamine oxide, dimethyl-hydrogenated tallowamine oxide, dimethylhexadecylamine oxide, bishydroxyethyldecyloxypropylamine oxide, bishydroxyethyltridecyloxypropylamine oxide, lauryl dimethylamine oxide, myristyl dimethylamine oxide, myristyl/cetyl dimethylamine oxide, cetyl dimethylamine oxide, stearyl dimethylamine oxide, cocoamido propyldimethylamine oxide, and mixtures thereof.

5. The treated and preserved wooden object according to claim 1 further containing at least one member selected from the group consisting of tetrasodium pyrophosphate, copper salts, sodium citrate, sodium N-dihydroxyethylglycinate, ammonium lignin sulfonate and sodium lignin sulfonate.

6. The treated and preserved wooden object according to claim 5 wherein said copper salts is present up to 1% by weight and is at least one member selected from the group consisting of copper hydroxide, copper oxide, copper sulfate, copper carbonate, and copper chloride, and mixtures thereof.

7. The treated and preserved wooden object according to claim 1 further containing up to about 0.5% by weight of a chelating agent.

8. The treated and preserved wooden object according to claim 7 wherein the chelating agent is ethylene diamine tetraacetic acid or the sodium salt thereof.

9. A treated and preserved wooden object having deposited within the wood fibers an essentially non-leachable chlorophenol formed therein by I. forming a wood treating and preserving solution by blending (A) from about 0.1% to about 50% by weight of a chlorophenol selected from a group consisting of pentachlorophenol and tetrachlorophenol and mixtures thereof, (B) from about 1% to about 97% by weight of an aliphatic alcohol having from one to six carbon atoms and mixtures thereof, (C) from about 0.5% to about 35% by weight of a fatty acid amine oxide having from about 10 to about 20 carbon atoms, (D) from about 1% to about 97% by weight water, (E) from about 0.02% to about 20% by weight sodium hydroxide, and (F) from about 0.2% to about 35% by weight of an amine selected from the group consisting of ammonium hydroxide, triethylamine, trimethylamine, methyl amine, and methyldiethanol amine, and mixtures thereof;

II. impregnating under heat and pressure the wooden objects;

III. separating said wooden objects from said solution; and

IV. drying said treated wooden objects.

10. The treated and preserved wooden object according to claim 9 wherein (C), said fatty acid amine oxide, is an amine oxide having the following formulation:

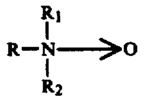

wherein R is a hydrocarbon radical of from about 10 to about 32 carbon atoms and $R_1$ and $R_2$ are each aliphatic radicals of from one to two carbon atoms or hydroxy substituted aliphatic radicals of from one to two carbon atoms or mixtures thereof.

11. The treated and preserved wooden object according to claim 10 wherein the amine oxide of (C) is selected from the group consisting of bis (2-hydroxyethyl) cocoamine oxide, bis (2-hydroxyethyl) tallowamine oxide, bis (2-hydroxyethyl) stearylamine oxide, dimethylcocoamine oxide, dimethyl-hydrogenated tallowamine oxide, dimethylhexadecylamine oxide, bishydroxyethyldecyloxypropylamine oxide, bishydroxyethyltridecyloxypropylamine oxide, lauryl dimethylamine oxide, myristyl dimethylamine oxide, myristyl/cetyl dimethylamine oxide, cetyl dimethylamine oxide, stearyl dimethylamine oxide, cocoamido propyldimethylamine oxide, and mixtures thereof.

12. The treated and preserved wooden object according to claim 9 wherein the aliphatic alcohol of (B) is selected from the group consisting of methyl alcohol, ethyl alcohol, n-butyl alcohol, isopropyl alcohol, n-propyl alcohol, allyl alcohol, secondary butyl alcohol, isobutyl alcohol and tertiary butyl alcohol and diacetone alcohol and mixtures thereof.

13. The treated and preserved wooden object according to claim 9 further containing at least one member selected from the group consisting of tetrasodium pyrophosphate, copper salts, sodium citrate, sodium N-dihydroxyethylglycinate, ammonium lignin sulfonate and sodium lignin sulfonate.

14. The treated and preserved wooden object according to claim 13 wherein said copper salt is present up to 1% by weight and is at least one member selected from the group consisting of copper hydroxide, copper oxide, copper sulfate, copper carbonate, and copper chloride, and mixtures thereof.

15. The treated and preserved wooden object according to claim 9 further containing up to about 0.5% by weight of a chelating agent.

16. A treated and preserved wooden object having deposited within the wood fibers an essentially non-leachable chlorophenate formed therein by I. forming a wood treating and preserving solution by blending (A) from about 0.1% to about 50% by weight of a chlorophenate selected from a group consisting of pentachlorophenate and tetrachlorophenate and mixtures thereof, (B) from about 1% to about 97% by weight of an aliphatic alcohol having from one to six carbon atoms and mixtures thereof, (C) from about 0.2% to about 35% by weight of a fatty acid amine oxide having from about 10 to about 32 carbon atoms, (D) from about 1% to about 97% by weight water, and (E) from about 0.2% to about 35% by weight of an amine selected from the group consisting of ammonium hydroxide, triethylamine, trimethylamine, methyl amine and methyldiethanol amine and mixtures thereof;

II. impregnating under heat and pressure the wooden objects;

III. separating said wooden objects from said solution; and

IV. drying said treated wooden objects.

* * * * *